Aug. 15, 1967  F. G. HEIMANN  3,335,653
VENTILATING LINER FOR VEHICLE
Filed Dec. 28, 1964  2 Sheets-Sheet 1
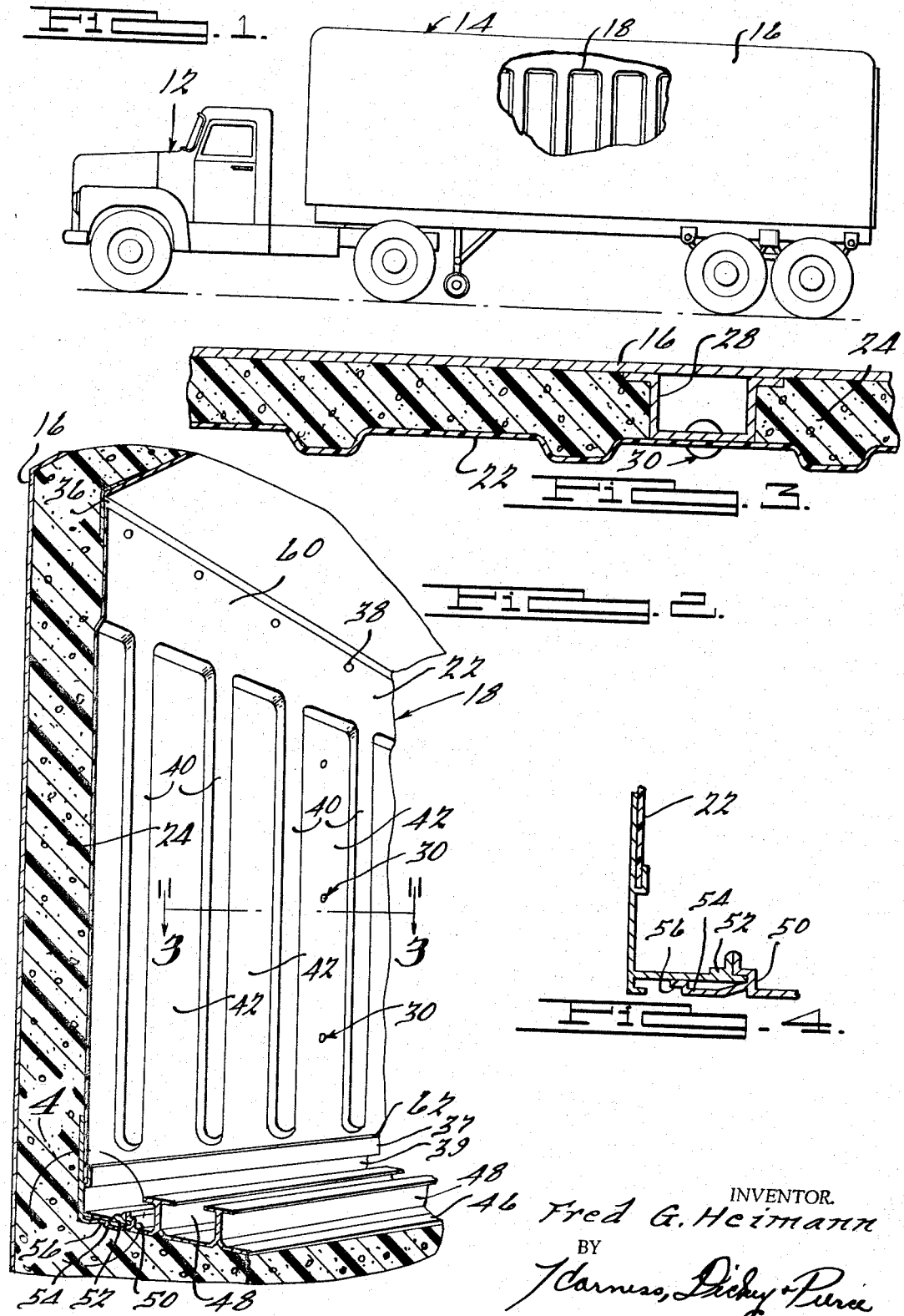
INVENTOR.
Fred G. Heimann
BY
Carness, Dickey & Pierce
ATTORNEYS.

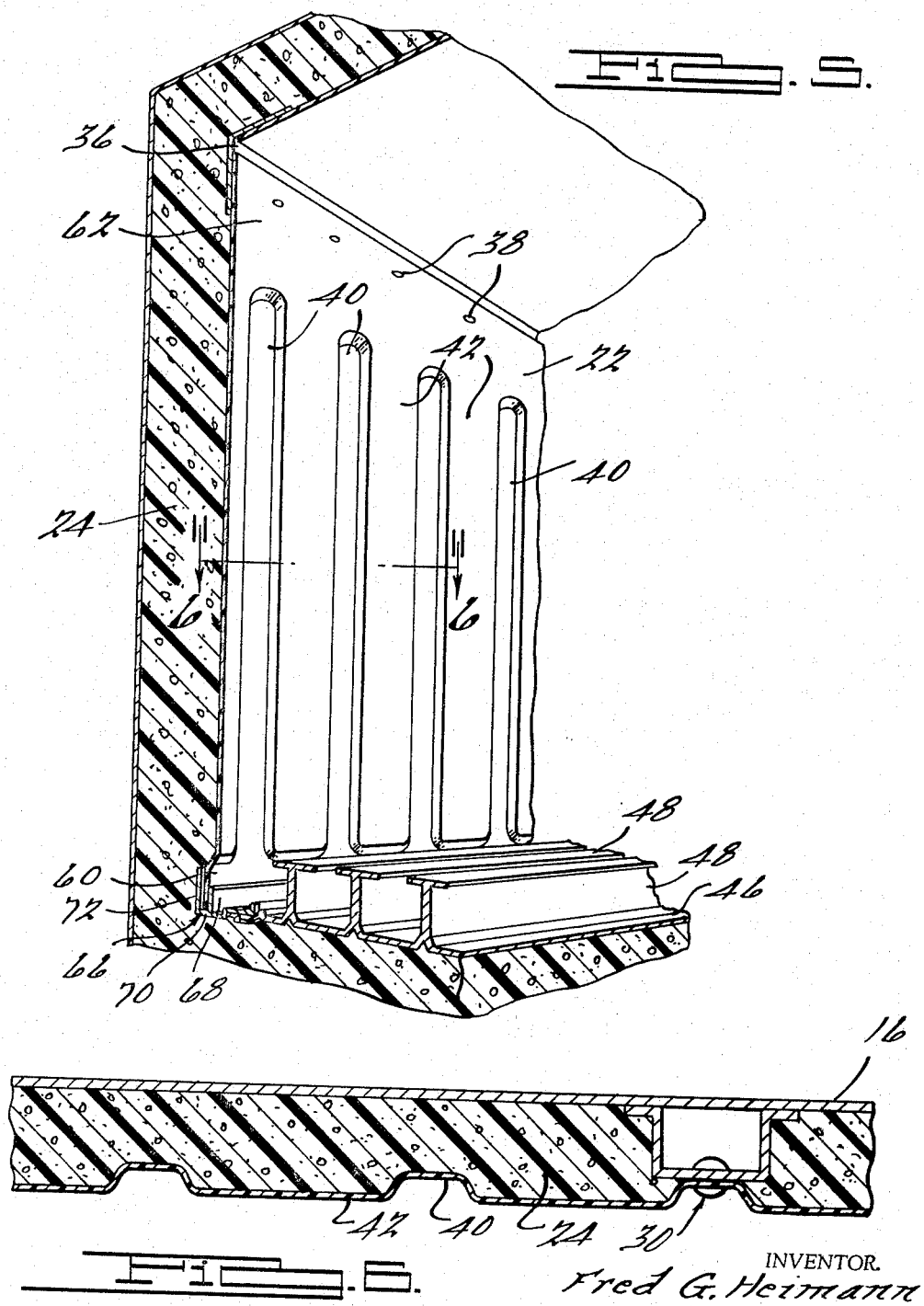

United States Patent Office 3,335,653
Patented Aug. 15, 1967

3,335,653
VENTILATING LINER FOR VEHICLE
Fred G. Heimann, Mount Clemens, Mich., assignor to Fruehauf Corporation, Detroit, Mich., a corporation of Michigan
Filed Dec. 28, 1964, Ser. No. 421,507
8 Claims. (Cl. 98—6)

This invention relates generally to an interior liner for vehicles, and more specifically to interior panels which are particularly adaptable for lining the interior of a refrigerated container such as trailers, railroad cars and the like.

In refrigerated containers of the type described above, it is necessary that the interior lining panels are provided with means to improve the circulation of cold air from the top of the payload to the bottom thereof thereby increasing the effective use of the refrigerated air and also to maintain temperature stability within the cargo. In the past, certain types of panels have been provided with depressions or grooves below the surface of the panels to achieve an effective flow of cooling air around the payload cargo. On the other hand, certain other types of panels have been provided with outwardly extending ribs to achieve the proper circulation. The choice of whether the container will be provided with panels having outwardly extending ribs or inwardly extending depressions is dictated in part by the type of load to be carried within the container, the anticipated flow of cold air about the payload, and the undesirable decrease in payload cube due to the use of ribs projecting into the interior of the container.

As these loads may vary in the use made of the containers, it is desirable to have a single panel to achieve the two configurations described above to accommodate the particular load contemplated. In the past, it has been necessary to keep the two types of linings on hand in order to fabricate the interior paneling of the vehicle with the desired configuration, thus producing a storage problem and an increased expense in providing duplicate sets of panel liners.

As to the various uses made of the containers, certain loads involve the transporting of a plurality of small boxes or bags, as for example, in the transporting of produce. Where the depressions in the panels or the spaces between the ribs are very large, these small cartons or bags tend to block off the flow of air and create undesirable temperature gradients. To cure this defect, it has been proposed to provide a panel with relatively narrow depressions or spaces. In this way the air ducts are preserved but an additional type of panel must be kept in stock.

As a further consideration, the liner panels described above must be of such a configuration as to permit the continuous flow of cool air within the ducts, whether the ducts are formed by depressions or ribs, between the ceiling and the floor, thus permitting the return of the air to the cooling unit. Therefore, the construction of the depressions or portions between the ribs must be such as to provide a continuous smooth surface from above the cargo level to a point at the floor level of the container or trailer. While certain of the prior art rib configurations provide the desired smooth surface, the depression configuration did not form a continuous surface with the general surface of the panel. However, the rib configuration involved the reduction of the cargo space due to the projection of the ribs from the surface defined by the upper portion of the panel.

The instant invention is calculated to provide the interior of a trailer with a lining panel which is adapted to be installed both in a configuration having ribs extending outwardly from the panel or by properly manipulating the panel, the panels will present depressions or grooves to the interior of the trailer. Moreover, the panels, in either position, will have the necessary smooth surface to the bottom portion of the panel from the depressions or between the ribs as described above thereby allowing the necessary flow of cold air between the top and the bottom of the cargo space. As will be seen from the following description, the instant invention requires that only one type of panel be stocked for use in lining the interiors of both types of containers described above. The liner is specifically calculated to provide the most efficient flow of cooling air about the periphery of the cargo.

Accordingly, it is one object of the present invention to provide an improved type of panel liner for refrigerated vehicles.

It is another object of the present invention to provide a panel liner which is adapted to be installed either to present ribs to the interior of the vehicle or depressions.

It is another object of the present invention to provide an improved liner panel which allows flow of cold air from the top of the load to the floor of the vehicle when in either of the above described positions.

It is still another object of the present invention to provide a liner panel which is easily installed in either the rib configuration or the depression configuration by proper orientation of the panel.

It is still another object of the present invention to provide a liner panel that is inexpensive to fabricate and rigid in its construction.

The manner of accomplishing the foregoing objects and other objects and features of the invention will be apparent from the following detailed description of the embodiments of the invention when read with reference to the accompanying drawings in which:

FIGURE 1 is a side view of a tractor-trailer combination with a portion of the trailer cut away to illustrate the interior liner panels embodying certain principles of the present invention;

FIG. 2 is an enlarged elevation view of the section of the interior panel of FIG. 1 illustrated in circle A thereof;

FIG. 3 is a cross-sectional view of the lining panel illustrated in FIG. 2, taken along lines 3—3 thereof;

FIG. 4 is a magnified view of the support structure of FIG. 2 as shown in the circle therein;

FIG. 5 is a perspective elevational view of the liner panel of FIG. 2 after it has been turned end-for-end and side-for-side and installed in the interior of the trailer; and FIG. 6 is a sectional view of the panel of FIG. 5 taken along lines 6—6 thereof.

Referring now to the drawings, and particularly to FIGS. 1 to 4, there is illustrated a tractor 12 and trailer 14 combination, the trailer 14 being suitably refrigerated by a refrigerating unit (not shown). The unit is partially supported on a shelf at the front of the trailer 14 and partially within the confines of the trailer housing. Trailer 14 is constructed in a conventional manner comprising an outer skin 16 surrounding the exterior of the trailer 14 and an interior liner panel assembly 18 which lines the walls of the trailer and is suitably attached to the exterior skin 16.

The liner assembly 18 generally comprises a plurality of liner members 22 which may be molded of any suitable plastic or like material, the liners 22 being positioned adjacent to, but spaced from, the outer skin 16 of the trailer to provide a space 24 therebetween. The space 24 may be foamed in situ or sheets of foamed material may be placed in the space 24 prior to the installation of the panel members 22.

The liner members 22 are placed in parallel overlapping relation to each other and are in face abutting relation to a plurality of posts 28 which are attached to the outer skin 16 as by riveting, or adhesively bonding, any other suitable means. The liner panel members 22 are attached to the post members 28 by a plurality of suitable rivets 30 which are passed through the overlapped portions of the liners 22 and into the post members 28. The upper portion of the panel 22 is attached to an upper structural member 36 by means of fasteners 38 which are similar to those described above. The lower edge of the panel member 22 may be inserted into a generally L-shaped support member 37 which has been attached or integrally formed with a lower structural member 39 and provides a continuous support across the bottom of the panel member 22. The flange type member 37 is seen to overlap the lower portion of the panel, thus precluding downward and outward movement of the panel away from the position shown in FIG. 2.

As stated above, the panels 22 are formed of an integrally molded structure, during which process the panels are provided with a plurality of ribs 40 separated by a plurality of spaces or depressions 42 which extend from the lower edge of the panel 22 to a point near to, but spaced from, the upper edge thereof, to be more specifically described. As is specifically seen in FIG. 2, the outer face of the ribs 40 are continuous and present a smooth surface with the upper surface of the panel 22 and the depressions 42 are continuous and form a smooth surface with the lower portion of the panel 22. In this way the air which flows between the ceiling and floor of the container by way of the panel member 22 may be guided in the duct formed by depressions 42 and the cargo which is spaced therefrom by the ribs 40.

As the air flows through the ducts formed by depressions 42 and the cargo placed up against the outer face of rib members 40, a smooth flow of air will be created between the ceiling and the floor of the container. It is to be particularly noted that the lower edge or portion of the panel is continuous and forms a smooth surface with the depression outer surface rather than with the outer surface of rib 40, as was common in the prior art. It is through this configuration that the unique flow of air is achieved with applicant's structure. Also, in the situation where the space 24 is foamed in situ, the particular configuration described above reduces the amount of foam material which is required to be used in filling the space as the depressions occupy a portion of the space 24.

The floor of the container or trailer 14 is provided with a sub-flooring structure 46 normally formed of some rigid metallic material and includes a plurality of I-beam type rails 48 which may either by integrally formed with the sub-floor member 46 or otherwise fastened thereto. The outer edges of the sub-floor members 46 are formed with an upstanding interlocking flange element 50 which is adapted to engage a mating flange member 52 formed on the lower structural member 39. These details are best illustrated in FIG. 4. The structural member 39 is normally formed of extruded material, thereby facilitating the manufacture and lowering the cost of the member 39. The flange element 50 is also provided with an additional member 54 which extends generally horizontally therefrom and has a tab element 56 extending upwardly and into engagement with the lower surface of the flange member 52, thereby providing additional support in the vertical direction for the flange member 52.

In fabricating the panels 22, the panels 22 are completed with an upper flange member 60 and a lower flange member 62 which are generally of equal dimension. When it is determined that the panel will be oriented in a particular direction, the lower flange member for the particular orientation, whether it be 60 or 62, is then cut off to size, thereby allowing the panel 22 to be fitted into the L-shaped flange 37 and to be contiguous with the upper structural member 36. Thus, the lower flange member 62 is only partially illustrated, as a portion thereof has been cut off to allow the panel to be fitted into position as shown.

Referring now to FIGS. 5 and 6, there is illustrated the identical panel 22 which is shown in FIGS. 1–3. However, the panel as illustrated in FIG. 5 has been turned end-for-end and side-for-side relative to the orientation shown in FIG. 2. Thus, the depressions 42 become the ribs in this particular embodiment and the ribs 40 of FIG. 2 become the depressions. Inasmuch as the decision as to which particular configuration is to be used in each container is made prior to the installation thereof, the panels are formed as complete panels having the flange 60 and the flange 62 intact. In the particular embodiment illustrated in FIG. 5 the flange 60 has been cut to length and inserted in a lower retaining member 66 which is a slight modification from the member 39 illustrated in FIG. 2.

The member 66 has been formed with a generally upstanding flange 68 which is integrally formed with a lower flange 70 of member 66. A backing member 72 forms, with upstanding flange 70, a pocket into which the lower portion 60 of the panel 22 is inserted. In this way the depressions 40, in this particular embodiment, are contiguous with a point below the general outline of the floor member (not shown). The structural members 46 and 48 are used in this particular embodiment as were described in conjunction with FIG. 2. It is to be noted that the grooves 40 are of generally narrower width than the grooves 42 of FIG. 2, thus allowing a smaller unit of cargo to be carried in this particular container. In this way the units of cargo are precluded from occupying the space within the grooves 40 thus cutting off the flow of cooling air.

As in the embodiment of FIGS. 1–3, the panels 22 are secured to the posts 28 by the rivets 30. The space 24 formed between liner 22 and outer skin 16 may be foamed in situ, as shown, or sheets of foam material may be inserted between posts 28. As was the case with the assembly 18, the depressions formed by ribs 40 are continuous and form a smooth surface with the lower portion 60 of the panel 22. In this way, the continuous flow of air between the ceiling and floor of the container 14 is maintained and provides an effective utilization of the cooling air.

While it will be apparent that the embodiments of the invention herein disclosed are well calculated to fulfill the objects of the invention, it will be appreciated that the invention is susceptible to modification, variation, and change without departing from the proper scope or fair meaning of the subjoined claims.

What is claimed is:
1. An enclosing member for enclosing the interior of a vehicle refrigerated by cooling fluid including an outer skin, a liner panel and insulation disposed between said outer skin and liner panel, the liner panel comprising;
an upper flange portion
having a first generally flat outer surface formed thereon,
a lower flange portion
having a second outer surface thereon formed spaced from said upper flange portion surface in a direction away from the interior of the vehicle, and
tion as shown.
a rib portion
formed intermediate said upper and lower flange portion and integral therewith having a plurality of parallel spaced ribs projecting toward the interior of the vehicle,
said ribs
having a surface formed thereon contiguous with said upper flange portion outer surface,
means
forming depressions between said ribs having an outer surface generally continuous with said outer surface of said lower flange portion for directing the flow of the cooling fluid between a point adjacent the upper flange portion and a point adjacent the lower flange portion.

2. An enclosing member for enclosing the interior of a vehicle refrigerated by cooling fluid including an outer skin, a liner panel and insulation disposed between said outer skin and liner panel, the liner panel comprising;
   an upper flange portion
      having a first generally flat outer surface formed thereon,
   a lower flange portion
      having a second outer surface thereon formed spaced from said upper flange portion surface in a direction away from the interior of the vehicle, and
   a rib portion
      formed intermediate said upper and lower flange portion and integral therewith having a plurality of parallel spaced ribs projecting toward the interior of the vehicle,
   said ribs
      having an outer surface generally continuous with said outer surface of said upper flange portion, and
   means
      forming depressions between said ribs having an outer surface generally continuous with said outer surface of said lower flange portion for directing the flow of the cooling fluid between a point adjacent the upper flange portion and a point adjacent the lower flange portion.

3. An enclosing member for enclosing the interior of a vehicle refrigerated by cooling fluid including an outer skin, a liner panel and insulation disposed between said outer skin and liner panel, the liner panel comprising;
   an upper flange portion
      for attaching said panel to the vehicle and having a first generally flat outer surface formed thereon,
   a lower flange portion
      having a second outer surface thereon formed spaced from said upper flange portion surface in a direction away from the interior of the vehicle and generally parallel thereto, and
   a rib portion
      formed intermediate said upper and lower flange portion and integral therewith having a plurality of parallel spaced ribs projecting toward the interior of the vehicle,
   said ribs
      having a surface formed thereon contiguous with said upper flange portion outer surface,
   said ribs
      having an outer surface generally continuous with said outer surface of said upper flange portion, and
   means
      forming depressions between said ribs having an outer surface generally continuous with said outer surface of said lower flange portion and generally parallel to said ribs outer surface for directing the flow of the cooling fluid between a point adjacent the upper flange portion and a point adjacent the lower flange portion.

4. A body assembly for a vehicle refrigerated by a cooling fluid comprising;
   an outer skin member,
   a floor structure, and
   a liner panel
      supported on said floor structure at a position spaced from said outer skin member,
   said liner panel
      including,
   an upper flange portion
      having a first generally flat outer surface formed thereon,
   a lower flange portion
      having a second outer surface thereon formed spaced from said upper flange portion surface in a direction away from the interior of the vehicle, and
   a rib portion
      formed intermediate said upper and lower flange portion and integral therewith having a plurality of parallel spaced ribs projecting toward the interior of the vehicle,
   said ribs
      having a surface formed thereon contiguous with said upper flange portion outer surface,
   means
      forming depressions between said ribs having an outer surface generally continuous with said outer surface of said lower flange member for directing the flow of the cooling fluid between a point adjacent the upper flange portion and a point adjacent the lower flange portion,
   said floor structure
      having flange means thereon engaging the lower edge of said lower flange portion for supporting said panel relative to said outer skin.

5. A body assembly for a vehicle refrigerated by a cooling fluid comprising;
   an outer skin member,
   a floor structure, and
   a liner panel
      supported on said floor structure at a position spaced from said outer skin member,
   said liner panel
      including,
   an upper flange portion
      having a first outer surface formed thereon,
   a lower flange portion
      having a second outer surface thereon formed spaced from said upper flange portion surface in a direction away from the interior of the vehicle and generally parallel thereto, and
   a rib portion
      formed intermediate said upper and lower flange portion and integral therewith having a plurality of parallel spaced ribs projecting toward the interior of the vehicle,
   means
      forming depressions between said ribs having an outer surface generally continuous with said outer surface of said lower flange portion and generally parallel to said ribs outer surface for directing the flow of the cooling fluid between a point adjacent the upper flange portion and a point adjacent the lower flange portion,
   said floor structure
      having flange means thereon engaging the lower edge of said lower flange portion for supporting said panel relative to said outer skin.

6. The assembly of claim 5 wherein said floor structure comprises a structural member having a generally vertically disposed support structure with said flange means integrally formed therewith at a point intermediate the ends of said vertical support structure.

7. The assembly of claim 6 wherein said flange means is a generally L-shaped member having a portion thereof disposed generally parallel to and spaced from said vertical support structure.

8. An enclosing member for enclosing the interior of a vehicle refrigerated by cooling fluid including an outer skin, a reversible liner panel and insulation disposed between said outer skin and liner panel, said liner panel being adapted to be utilized in a first position and in a second position wherein the panel is turned end-for-end and side-for-side relative to said first position comprising;
   an upper flange portion
      having a first generally flat outer surface and a first inner surface parallel thereto, a lower flange portion
  having a second outer surface and a second inner surface parallel thereto,
means
  for rendering said liner panel reversible including a rib portion
    formed intermediate said upper and lower flange portion and integral therewith having a plurality of parallel, spaced, hollow ribs projecting toward the interior of the vehicle,
said ribs
  having a surface formed thereon contiguous with said upper flange portion outer surface,
said ribs
  having an outer surface generally continuous with said first outer surface and an inner surface generally continuous with said first inner surface, and
means
  forming depressions between said ribs having an outer surface generally continuous with said second outer surface and an inner surface generally continuous with said second inner surface for directing a quantity of flow of the cooling fluid between a point adjacent the upper flange portion and a point adjacent the lower flange portion,
said panel
  being reversible by turning the panel end-for-end and side-for-side wherein said first inner surface becomes said second outer surface and said second inner surface becomes said first outer surface for changing the quantity of the flow of the cooling fluid.

References Cited

UNITED STATES PATENTS

| | | | |
|---|---|---|---|
| 2,058,871 | 10/1936 | Heath | 62—523 |
| 2,143,171 | 1/1939 | Anderson | 62—523 |
| 2,791,463 | 5/1957 | Levitt | 296—31 |
| 2,962,323 | 11/1960 | McBride | 296—31 |
| 2,979,310 | 4/1961 | Nicholson | 62—523 X |
| 3,141,500 | 7/1964 | Raskin | 62—523 |
| 3,159,982 | 12/1964 | Schachner | 62—523 X |
| 3,206,946 | 9/1965 | Lindersmith | 98—6 X |

MEYER PERLIN, *Primary Examiner.*

UNITED STATES PATENT OFFICE

CERTIFICATE OF CORRECTION

Patent No. 3,335,653                         August 15, 1967

Fred G. Heimann

It is hereby certified that error appears in the above numbered patent requiring correction and that the said Letters Patent should read as corrected below.

Column 3, line 49, for "by" read -- be --; column 4, line 60, strike out "tion as shown." and insert the same after "posi-" in line 74, column 3.

Signed and sealed this 13th day of August 1968.

(SEAL)
Attest:

Edward M. Fletcher, Jr.                           EDWARD J. BRENNER
Attesting Officer                                   Commissioner of Patents